Dec. 4, 1962    R. HALL ET AL    3,067,063
INSULATED CONDUCTOR
Filed Dec. 5, 1955
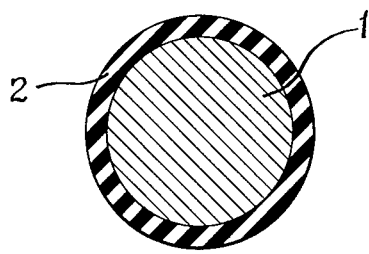
INVENTORS.
RALPH HALL
EARL L. SMITH
BY GEORGE D. HILKER
ATTORNEYS

United States Patent Office 3,067,063
Patented Dec. 4, 1962

3,067,063
INSULATED CONDUCTOR
Ralph Hall, Earl L. Smith, and George Daniel Hilker, Fort Wayne, Ind., assignors, by mesne assignments, of one-half to Phelps Dodge Copper Products Corporation, a corporation of Delaware, and one-half to Shawinigan Resins Corporation, Springfield, Mass., a corporation of Massachusetts
Filed Dec. 5, 1955, Ser. No. 551,193
4 Claims. (Cl. 117—232)

This invention relates to the manufacture of insulated electrical conductors of the type in which the insulation is an organic enamel of the kind known in the trade as wire enamel. More particularly, the invention relates to an improved insulated conductor of this type and a method of making the same, the insulation of the conductor being characterized by excellent resistance to refrigeration liquids and gases of the chlorofluoro type, particularly monochlorodifluoromethane (Freon 22).

As pointed out in Jackson and Hall Patent 2,307,588, 15–19 polyvinyl formal ("Formvar") can be reacted with cresol formaldehyde resin to produce a resinous composition of outstanding properties for insulation of wire used in the winding of electrical motors, transformers and coils. This type of wire is commonly identified in the trade as "Formvar, Formex," and has found wide use in the electrical industry in many types of applications. One of the useful features of the polyvinyl formal-cresol resin when used as a wire insulation is its ability to resist chemical attack by dichlorodifluoromethane (Freon 12), so that the wire can be used for hermetic refrigerator motors in refrigerating systems having this liquid as a refrigerant. In these motors, the windings are in direct contact with the gas and liquid refrigerant.

Recently, however, monochlorodifluoromethane (Freon 22) has been used as a refrigerant. This refrigerant, being a more active solvent, has been found to soften the conventional wire insulation made of polyvinyl formal-cresylic resin, and has been responsible in many cases for failures of electrical motors which in service are subjected to the gas or liquid refrigerant. The refrigerant softens the insulation and causes subsequent copper-to-copper failure. Also, it has been found that the conventional insulation of the polyvinyl formal-cresylic resin type has a tendency, when immersed in Freon 22 and then subjected to heat, to blister badly from the fast evaporation of the Freon 22 absorbed in the insulating film.

We have discovered that a wire insulation having unusual resistance to the more active Freon refrigerants, such as monochlorodifluoromethane (Freon 22), can be produced by combining a resinous condensation product of an aldehyde and a partially or completely hydrolyzed polymerized vinyl ester with a reactive isocyanate resin which is compatible therewith. The new insulation exhibits practically complete insolubility in the liquid or gaseous refrigerants and can be used to particular advantage as an insulation for copper wires for winding refrigerator motors using Freons which normally soften the conventional polyvinyl formal-cresylic resin insulated wire. Not only does this new insulating composition exhibit unusual resistance to Freon 22, but it does not sacrifice the essential properties required for an insulated wire, and for all practical purposes produces an insulated wire equivalent to the conventional types of "Formvar" wire based on the polyvinyl formal-cresylic resin mixture. Moreover, the new insulated wire is capable of being soldered without stripping at approximately 100° F. lower than the conventional "Formvar" type wire, and it has unusual resistance to chlorinated solvents such as trichloroethylene. It is possible with this insulating composition to produce fine wires which will solder without removal of the insulation, thus enhancing its value as an insulated wire.

In addition to its excellent resistance to refrigerants such as Freon 22 and its good solderability, the new wire insulation is tough, hard and flexible and has good abrasion-resistance, moisture resistance and thermal aging properties. The insulation also has high dielectric strength and good chemical resistance generally.

According to the invention, the resinous composition comprising the hydrolyzed polymerized ester aldehyde condensation product and the reactive isocyanate is dissolved in a suitable solvent and coated on the wire, as by any conventional wire enameling procedure. The solvent is then evaporated and the coating rapidly cured as by baking at high temperature.

The resinous hydrolyzed polymerized ester aldehyde condensation product mentioned above is described in Reissue Patent No. 20,430 dated June 29, 1937, and it may be produced as shown in this patent. The production of the various vinyl acetals, including the 15–95 polyvinyl formal, is well known in the art. The resin we prefer is the conventional 1595E polyvinyl formal, although other polyvinyl formals can be used. The 1595E polyvinyl formal contains 5–6% of polyvinyl alcohol and 9.5%–13% polyvinyl acetate, and is described more particularly in an article entitled "The Manufacture, Properties and Uses of Polyvinyl Formal" by A. F. Fitzhugh et al., which appeared in the Journal of Electrochemical Society, vol. 100, No. 8, August 1953. Other suitable polyvinyl formals are also described in this Fitzhugh et al. article.

The isocyanate resin previously mentioned is preferably the "blocked" isocyanate generally described as a tri-adduct of toluene di-isocyanate, the NCO groups of which have been closed by a stabilizer such as a phenol grouping. The chemical structure of one such "blocked" isocyanate can be written as follows:

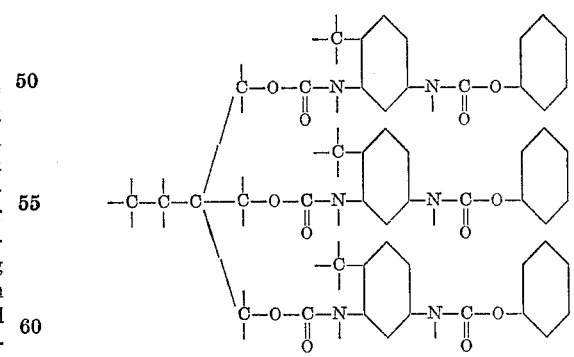

Other means of blocking the isocyanate may be used as long as the resulting product after unblocking at wire enameling temperatures above 140° C. is the reactive isocyanate.

The isocyanates of the "blocked" type are generally known in the trade as "A.P. Stabil" produced by Farben Fabriken Bayer of Leverkusen, Germany or "Mondur S" produced by Mobay Chemical Company of St. Louis, Missouri. The "blocked" isocyanate makes possible the manufacture of stable solutions which can be handled for application to insulated magnet wires. "Unblocked" isocyanates can be used, but their pot life is generally very short, making accurate control of viscosity difficult.

The preferable way of forming the resin solution for coating the wire is to dissolve the polyvinyl formal and the "blocked" isocyanate in solvents such as cresylic acid and high solvent naphthas. Other solvents for the resins may be used as long as they produce compatible solutions and provide the proper evaporation range for the particular method selected for application of the insulating composition to the wire.

Examples of suitable cresylic acids are the tar acids boiling between the range of 200°–230° C. Examples of suitable solvent naphthas are those commonly known as wire enamel solvent naphthas such as "Coal Tar High Flash," or as hydrogenated petroleum solvents of high aromatic values, such as "NJ–100" or "Solvesso–100."

The relative proportions of the polyvinyl formal and the reactive isocyanate are not critical in that, in general, an insulating composition having the desired properties can be provided which contains these compounds in a ratio of 20 to 80 parts of isocyanate and 20 to 80 parts of polyvinyl formal by weight. When a polyester is also included in the composition, as described more fully hereinafter, the ratio will generally be 20 to 80 parts of isocyanate, 10 to 70 parts of polyvinyl formal, and 10 to 40 parts of the polyester.

While we are not certain as to the exact nature of the chemical reaction which occurs in the curing of the insulating composition on the wire, we believe that it involves a reaction of the isocyanate with the free OH groups or active hydrogen groups in the polyvinyl formal.

The following are examples of the new wire insulating composition. In each case, the resinous compounds dissolved in the solvents were applied to the wire by following conventional wire enameling practice wherein the viscous solution was die-coated on the wire and cured by passing the wire through a baking oven having a temperature gradient of from about 400° F. to 800° F.

EXAMPLE I

Formula:
Resins, 20% composed of: Percent by weight
    Mondur "S" (isocyanate) _____ 12.0
    Formvar 1595E (polyvinyl formal) _____ 8.0
Solvents, 80% composed of:
    Cresylic acid _____ 40.0
    NJ–100 (naphtha) _____ 40.0
Viscosity at 30° C., approximately 4500 cps.

The proper amount of naphtha is weighed into a mixing tank. The Mondur S is broken up into small lumps to facilitate solution and added to the naphtha along with the granular, powder-like Formvar resin. The above described mixture is then agitated rather vigorously in order to prevent the heavy particles of Mondur S from settling to the bottom, and the proper amount of cresylic acid is added. Mild heat (about 60° C. or less) is then applied to facilitate solution while agitation continues. The resulting enamel is a clear, viscous solution. (It may be dyed, if desired, by adding a small amount of a suitable dye and stirring until the dye is dissolved). Preferably, the enamel is filtered through a pressure filter prior to use for enameling wire.

EXAMPLE II

Formula:
Resins, 18% composed of: Percent by weight
    Mondur "S" _____ 9.0
    Formvar 1595E _____ 9.0
Solvents, 82% composed of:
    Cresylic acid _____ 41.0
    NJ–100 _____ 41.0
Viscosity at 30° C., approximately 4700 cps.

EXAMPLE III

Formula:
Resins, 16% composed of: Percent by weight
    Mondur "S" _____ 6.4
    Formvar 1595E _____ 9.6
Solvents, 84% composed of:
    Cresylic acid _____ 42.0
    NJ–100 _____ 42.0
Viscosity at 30° C., approximately 4500 cps.

EXAMPLE IV

Same formula and general procedures as described under Example II, with the exception that the Formvar has the following approximate analysis:

Percent by weight
Percent polyvinyl alcohol _____ 13.7
Percent polyvinyl acetate _____ 9.4
Viscosity at 30° C., approximately 4700 cps.

It is possible to modify these insulating compositions by the addition of other resins. For example, polyesters of the various types can be used. The major function of the polyester is to reduce further the soldering time, thus making it possible to produce wires which solder without cleaning at temperatures in the range of 600°–750° F. Examples of these polyesters are ethylene glycol-adipic acid; phthalic anhydride-adipic acid-trimethylolpropane or glycerin; adipic acid-1,4 butylene glycol-hexane triol; and adipic acid-glycerin or trimethylolpropane-1,4 butylene glycol. These are generally described as di-acids plus polyols which provide varying ratios of free OH groups for cross-linking with the isocyanates and Formvar. These are identified in the trade as "Multrons" produced by Mobay or "Desmophens" produced by Bayer.

EXAMPLE V

Formula:
Resins, 28% composed of: Percent by weight
    Mondur "S" _____ 14.0
    Formvar #1595E _____ 7.0
    Multron R2 (or Desmophen 600) _____ 7.0
Solvents, 72 percent composed of:
    Cresylic acid _____ 36.0
    NJ–100 _____ 41.0
Viscosity at 30° C., approximately 4000 cps.

EXAMPLE VI

Formula:
Resins, 28% composed of: Percent by weight
    Mondur "S" _____ 14.70
    Formvar #1595E _____ 7.49
    Multron R4 (or Desmophen 800) _____ 5.81
Solvents, 72% composed of:
    Cresylic acid _____ 36.0
    NJ–100 _____ 36.0
Viscosity at 30° C., approximately 3000 cps.

Table I shows the comparative tests between the conventional Formvar (vinyl acetal-phenolic) and typical combinations of isocyanate-vinyl acetal and isocyanate-vinyl acetal-polyester.

Table I
COMPARISON TESTS ON AN 18 AWG HEAVY WIRE

| Material | A<br>66⅔ vinyl acetal, 33⅓ cresylic resin conventional Formvar wire | B<br>Isocyanate vinyl acetal, polyester, Example V | C<br>Isocyanate vinyl acetal, Example I |
|---|---|---|---|
| I. Physical properties: | | | |
| A. Build | .0029–.0030″ | .0030–.0031″ | .0027–.0030″ |
| B. Film flexibility on 1X mandrels | OK—20% 1X | OK—20% 1X | OK—20% 1X. |
| C. Adherence (snap test) | OK | OK | OK. |
| D. Abrasion scrape (NEMA–700 grams) | 119 | 73 | 99. |
| E. Unilateral—25° C. .016″ needle | 80–84 oz | 88–92 oz | 76–80 oz. |
| II. Chemical properties: | | | |
| A. Solvent resistance: | | | |
| Petroleum naphtha | No effect | No effect | No effect. |
| 3% toluene | do | do | Do. |
| Ethyl alcohol | Sl. softening | do | Do. |
| 5% sulphuric acid | No effect | do | Do. |
| 1% potassium hydroxide | do | do | Do. |
| Butyl acetate | Sl. softening | do | Do. |
| Styrene | Softens | do | Do. |
| Trichloroethylene | Dissolves | do | Do. |
| B. Softening in Freons: | | | |
| 1. Abrasion scrape after 2 hr. immersion in Freon 12 | 700 g.-28 | 700 g.-94 | 700 g.-105. |
| 2. Abrasion scrape after 2 hr. immersion in Freon 22 | 200 g.-5 | 700 g.-46 | 700 g.-82. |
| C. Extraction: | | | |
| Methanol | .51% | .49% | .42%. |
| Toluol | 4.1% | 1.1% | .08%. |
| D. Crazing—Coils on ½ mandrel in solvent: | | | |
| 1. Coil dipped in toluene | Craze | Craze | Craze. |
| 2. Coil dipped in alcohol | do | do | Do. |
| 3. Coils heated to 125° C. before dipping in toluene | No craze | No craze | No craze. |
| 4. Coils heated to 125° C. before dipping in alcohol | do | do | Do. |
| III. Thermal properties: | | | |
| A. Flexibility life at 125° C.—Hours to fail on 3X mandrel NEMA test | 432 | 1,200 | 250. |
| B. Heat shock—3X then 1 Hour, 125° C. NEMA | OK | OK | OK. |
| C. Dielectric life AIEE test procedure: | | | |
| 220° C., hours | 48 | 45 | 47. |
| 175° C., hours | 402 | 942 | 500. |
| 150° C., hours | 1,238 | 4,000 | 2,445. |
| D. Cut through—Phelps Dodge test, 5 lbs. on cross-over, temperature to short | 210° C | 250° C | 300° C. |
| E. Unilateral scrape—.016″ needle at 125° C | 40–44 oz | 60–64 oz | 60–64 oz. |
| F. Solderability—Temperature to tin 1 inch length in 60/40 solder | 950° F | 750° F | 850° F. |
| IV. Electrical properties: | | | |
| A. Dielectric twist, NEMA | 9,000 | 9,800 | 8,000. |
| B. Insulation resistance on NEMA twist sample boiled for 2 hours in water, megohms | 210,000 | 1,000,000 | 800,000. |

The test for softening in Freon (II B) is conducted as follows:

(1) Samples approximately six inches long are placed in a glass pressure tube assembly.

(2) The wire loaded container is filled with liquid Freon and sealed by means of a needle valve.

(3) After two hours at room temperature, the container is placed in a cold box maintained at —45° C. for one hour.

(4) The container can then be unsealed and the cover removed with the Freon remaining as a liquid.

(5) Samples are removed one at a time from the liquid Freon and subjected to an abrasion test in a NEMA Repeated Scrape Abrasion Tester.

The abrasion test is made with a .016″ needle with loads varied in steps of 50 or 100 grams to obtain the load to give an average scrape between 10 and 20 cycles with the average as close to 15 cycles as reasonable. In no case, however, is the load greater than standard used for the wire when dry.

The time elapsed between removing each sample from the container and starting the abrasion scrape machine is held to 20 seconds plus or minus one second.

Since the total time between removal of each sample from the liquid Freon and completion of the test is essentially the same for any sample tested, direct and reliable comparisons can be made. If the insulation is so unaffected by Freon that more than 20 cycles are obtained at maximum load, comparison can be made to the dry scrape results if desired.

The Extraction test (IIC) is a measure of the quantity of insulation extracted in boiling methanol and boiling toluol.

In the accompanying drawing, FIG. 1 is a cross-sectional view, on an enlarged scale, of a magnet wire made according to the invention.

The magnet wire, as shown, comprises a copper conductor 1 having a coating or covering 2 of the new insulation which, as previously mentioned, may be applied by conventional wire enameling procedures.

We claim:

1. An insulated electrical conductor having an enamel-type insulation covering which comprises a mixture of a reactive isocyanate and a polyvinyl formal resin cured on the conductor to provide a hard, flexible, tough and abrasion-resistant insulation having good resistance to monochloro-difluoromethane, the isocyanate and polyvinyl formal being present in a ratio of 20 to 80 parts of isocyanate and 20 to 80 parts of polyvinyl formal.

2. An insulated electrical conductor according to claim 1, in which the isocyanate is a tri-adduct of toluene di-isocyanate, the NCO groups of which are closed by a stabilizer.

3. A method of insulating an electrical conductor, which comprises forming a solution of a reactive isocyanate and a polyvinyl formal resin, said solution containing the isocyanate and polyvinyl formal in a ratio of 20 to 80 parts of isocyanate and 20 to 80 parts of polyvinyl formal, coating the conductor with said solution and baking the coating to cure it to a hard, flexible, tough and abrasion-resistant insulation on the conductor.

4. The method according to claim 3, in which the isocyanate is a tri-adduct of toluene di-isocyanate, the NCO groups of which are closed by a stabilizer.

References Cited in the file of this patent

UNITED STATES PATENTS

| | | |
|---|---|---|
| 2,284,895 | Hanford et al. | June 2, 1942 |
| 2,284,896 | Hanford et al. | June 2, 1942 |
| 2,430,479 | Pratt et al. | Nov. 11, 1947 |
| 2,454,678 | Smith et al. | Nov. 23, 1948 |
| 2,723,265 | Stallmann | Nov. 8, 1955 |

FOREIGN PATENTS

| | | |
|---|---|---|
| 709,304 | France | May 19, 1954 |